US012497607B2

United States Patent
Kiessig et al.

(10) Patent No.: US 12,497,607 B2
(45) Date of Patent: Dec. 16, 2025

(54) PLASMINOGEN FOR USE IN TREATING AND PREVENTING LUNG DYSFUNCTION

(71) Applicant: PREVIPHARMA CONSULTING GMBH, Mannheim (DE)

(72) Inventors: Stephan T. Kiessig, Wiesloch (DE); Ricarda Welz, Mauer (DE); Elena Willig, Mannheim (DE)

(73) Assignee: PREVIPHARMA CONSULTING GMBH, Mannheim (DE)

( * ) Notice: Subject to any disclaimer, the term of this patent is extended or adjusted under 35 U.S.C. 154(b) by 491 days.

(21) Appl. No.: 17/996,831

(22) PCT Filed: Apr. 23, 2021

(86) PCT No.: PCT/EP2021/060727
§ 371 (c)(1),
(2) Date: Oct. 21, 2022

(87) PCT Pub. No.: WO2021/214320
PCT Pub. Date: Oct. 28, 2021

(65) Prior Publication Data
US 2023/0146662 A1    May 11, 2023

(30) Foreign Application Priority Data
Apr. 23, 2020    (EP) .................................... 20171188

(51) Int. Cl.
C12N 9/68    (2006.01)
A61K 38/48    (2006.01)
A61P 11/00    (2006.01)

(52) U.S. Cl.
CPC ............ *C12N 9/6435* (2013.01); *A61K 38/48* (2013.01); *A61K 38/482* (2013.01); *A61K 38/484* (2013.01); *A61P 11/00* (2018.01); *C12Y 304/21007* (2013.01); *C12Y 304/21068* (2013.01)

(58) Field of Classification Search
CPC .. C12N 9/6435; A61K 38/482; A61K 38/484; A61K 38/49; A61P 11/00; C12Y 304/21007; C12Y 304/21068
See application file for complete search history.

(56) References Cited

U.S. PATENT DOCUMENTS 11,291,711 B2 *    4/2022    Robitaille ................ A61P 29/00

FOREIGN PATENT DOCUMENTS

| WO | 1998/006426 A1 | 2/1998 |
| WO | 2017/077380 A1 | 5/2017 |
| WO | 2018/162754 A1 | 9/2018 |

OTHER PUBLICATIONS

U.S. Appl. No. 17/422,962 (Year: 2021).*
Wade-Evans, Pulmonary Hyaline membranes, Aspiration and Pneumonia, Arch. Dis. Child., 1961, 36(187):293-301.
Northway et al., Pulmonary disease following respiratory therapy of hyaline-membrane disease—Bronchopulmonary dysplasia, 1967, The New England Journal of Medicine, 276(7):357-368.
Chan et al., Risk of Early-Onset Neonatal Infection with Maternal Infection or Colonization: A Global Systematic Review and Meta-Analysis, PLoS Medicine, 2013, 10(8):e1001502.
Rodriguez et al., (2002). Respiratory distress syndrome and its management, in Fanaroff, Avroy A; Martin, Richard J (eds.). Neonatal-perinatal medicine: diseases of the fetus and infant, 2002, St. Louis: Mosby. pp. 1001-1011. ISBN 978-0-323-00929-4.
Schwartz et al., Effect of surfactant on morbidity, mortality, and resource use in newborn infants weighing 500 to 1500 g,. The New England Journal of Medicine, 1994, 330(21):1476-1480.
Von der Hardt et al., Aerosolized perfluorocarbon suppresses early pulmonary inflammatory response In a surfactant depleted piglet model, Pediatric Research, 2002, 51(2):177-182.
Jobe, Post-conceptional age and IVH in ECMO patients, The Journal of Pediatrics, 2004, 145(2):A2.
Stevens et al., Early surfactant administration with brief ventilation vs selective surfactant and continued mechanical ventilation for preterm infants with or at risk for respiratory distress syndrome, The Cochrane Database of Systematic Reviews, Cochrane Database Syst Rev., Oct. 17, 2007;(4):CD003063.
Stewart et al., Diuretics for Respiratory Distress Syndrome in Preterm Infants, Cochrane Database Syst Revs., 2011, Dec. 7, 2011(12):CD001454.
Ozolina et al., Activation of Coagulation and Fibrinolysis in Acute Respiratory Distress Syndrome: A Prospective Pilot Study, Front Med (Lausanne), 2016, 3:64. Published Nov. 2, 20168. doi:10.3389/fmed.2016.00064.
Schouten et al., Increased mortality in elderly patients with acute respiratory distress syndrome is not explained by host response, Intensive Care Med Exp., 2019, 7(1):58. Published Oct. 29, 2019. doi:10.1186/s40635-019-0270-1.
Wang et al., Tissue Plasminogen Activator (IPA) Treatment for COVID-19 Associated Acute Respiratory Distress Syndrome (ARDS): A Case Series, J Thromb Haemost, Apr. 8, 2020. doi: 10.1111/jth.14828.
Moore et al., Is There a Role for Tissue Plasminogen Activator (tPA) as a Novel Treatment for Refractory COVID-19 Associated Acute Respiratory Distress Syndrome (ARDS)?, J Trauma Acute Care Surg. Mar. 20, 2020. doi: 10.1097/TA.0000000000026949.
Stubblefield et al., Variable Resistance to Plasminogen (PLG) Activator Initiated Fibrinolysis for Intermediate-Risk Pulmonary Embolism, PLoS One, Feb. 11, 2016;11(2):e0148747. doi: 10.1371/journal.pone.0148747. eCollection 2016.
Cullis et al., Unresolved pulmonary embolism: the role of fibrinolysis, Nucl Med Commun, 1993, 14(1):4-7.

(Continued)

*Primary Examiner* — Ruth A Davis
(74) *Attorney, Agent, or Firm* — RAPHAEL BELLUM PLLC

(57) ABSTRACT

The present invention relates to plasminogen for use in a method for treating or preventing lung dysfunction associated with the formation of hyaline membranes in a patient, wherein the patient is preferably further administered with at least one plasminogen activator.

24 Claims, No Drawings

(56) References Cited

OTHER PUBLICATIONS

Kunamneni and Durvasula, Streptokinase—A Drug for Thrombolytic Therapy: A Patent Review. Recent advances in cardiovascular drug discovery, 2014, pp. 106-121.
Takada and Takada, Activation pathway of Glu-plasminogen to Lys-plasmin by urokinase, Thrombosis research, 1982, pp. 671-677.
Wohl, Kinetics of activation of human plasminogen (PLG) by different activator species at pH 7.4 and 37 degrees C, The Journal of Biological Chemistry, 1980, pp. 2005-2013.
Fredenburgh and Nesheim, Lys-plasminogen is a significant intermediate in the activation of Glu-plasminogen during fibrinolysis in vitro, The Journal of Biological Chemistry, 1992, pp. 26150-26156.
Rehberg et al., Advantages and pitfalls of combining intravenous antithrombin with nebulized heparin and tissue plasminogen activator in acute respiratory distress syndrome, J Trauma Acute Care Surg., 2014, 76(1):126-133.
Wu et al., Plasminogen improves lung lesions and hypoxemia in patients with COVID-19, published online ahead of print, Apr. 10, 2020,. QJM. 2020;hcaa121. doi:10.1093/qjmed/hcaa121.
Castellino et al., Structure and function of the plasminogen (PLG)/plasmin system, Thrombosis and Haemostasis, 2005, pp. 647-654.
Stricker and Wong, Activation of plasminogen (PLG) by tissue plasminogen (PLG) activator on normal and thrombasthenic platelets: effects on surface proteins and platelet aggregation, Blood, 1986, pp. 275-280.
Miles, et al., Plasminogen receptors. Journal of Biomedicine and Biotechnology, 2012, 130735. doi: 10.1155/2012/130735.
Charlton et al. (Thromb. Haemost, 1996, 75(5):808-815.

\* cited by examiner

PLASMINOGEN FOR USE IN TREATING AND PREVENTING LUNG DYSFUNCTION

The present invention relates to plasminogen for use in a method for treating or preventing lung dysfunction associated with the formation of hyaline membranes in a patient, wherein the patient is preferably further administered with at least one plasminogen activator.

Lung dysfunctions such as severe respiratory distress syndrome are still a frequent cause of death. In particular, pneumonia is still a common life-threatening condition. The onset of pneumonia may have different causes such as viral or bacterial infections by the lung or surrounding tissues. Pneumonia may also have alternative reasons.

Lung dysfunctions are often associated with the formation of microthrombi. Furthermore, lung dysfunctions are also often associated with the formation of hyaline membranes in the lung membranes (Wade-Evans, Pulmonary Hyaline membranes, Aspiration and Pneumonia, Arch. Dis. Child., 1961, 36(187):293-301). The word "hyaline" comes from the Greek word "hyalos" meaning glassy or transparent stone such as crystal. The membrane in hyaline membrane disease looks glassy.

Hyaline membranes found in the lungs of newborn babies have been shown to consist essentially of fibrin, so that they do not differ in their nature from those found in older patients. A respiratory disease of the newborn, especially the premature infant, in which a membrane composed of proteins and dead cells lines the alveoli (the tiny air sacs in the lung), making gas exchange difficult or impossible. In the latter membranes may arise in the course of a number of different pathological processes, and the possibility that this is so in the newborn is considered.

There were reported cases in which membranes occurred in the lungs of the newborn as a result of pneumonia, in a first group with accompanying aspiration of meconium or other material, in a second group without evidence of aspiration but also intrapartum in origin, and in a third group acquired after birth.

Lung dysfunctions associated with hyaline membrane formation is often designated as respiratory distress syndrome (RDS) including acute respiratory distress syndrome (ARDS), in infants: infant respiratory distress syndrome (IRDS). It is caused by a deficiency of a molecule called surfactant, also called respiratory distress syndrome of newborn, or increasingly surfactant deficiency disorder (SDD) (Northway et al., Pulmonary disease following respiratory therapy of hyaline-membrane disease—Bronchopulmonary dysplasia, 1967, The New England Journal of Medicine, 276(7):357-368) and previously called hyaline membrane disease (HMD), is a syndrome in premature infants caused by developmental insufficiency of pulmonary surfactant production and structural immaturity in the lungs. It can also be a consequence of neonatal infection and can result from a genetic problem with the production of surfactant-associated proteins (Chan et al., Risk of Early-Onset Neonatal Infection with Maternal Infection or Colonization: A Global Systematic Review and Meta-Analysis, PLoS Medicine, 2013, 10(8):e1001502).

Infant respiratory distress syndrome (IRDS) affects about 1% of newborns and is the leading cause of death in preterm infants (Rodriguez et al., (2002). "Respiratory distress syndrome and its management, in Fanaroff, Avroy A; Martin, Richard J (eds.). Neonatal-perinatal medicine: diseases of the fetus and infant, 2002, St. Louis: Mosby. pp. 1001-1011. ISBN 978-0-323-00929-4). IRDS may be distinguished from pulmonary hypoplasia, another leading cause of neonatal death that involves respiratory distress. IRDS frequently occurs in newborns born before 37 weeks of gestation. The more premature the baby is, the greater is the incidence of developing IRDS. IRDS is more likely to occur in newborns of diabetic mothers.

Also other lung diseases can be correlated with the formation of hyaline membranes such as viral or bacterial pneumonia. The incidence decreases with advancing gestational age, from about 50% in babies born at 26-28 weeks to about 25% at 30-31 weeks. The syndrome is more frequent in males, Caucasians, infants of diabetic mothers and the second-born of premature twins.

Lung dysfunction associated with the formation of hyaline membranes reduces the exchange of oxygen and $CO_2$ and, thus, may cause serious health problems and may even be lethal. Such decreased oxygen saturation and decreased removal of $CO_2$ can lead to death within a short time.

An inflammation in the lung and the bronchioles can result in disturbances of the blood circulation ending in the formation of thrombi in the terminal vascular bed. If the small blood vessels (capillaries, arterioles, venules) are once barred, the gas exchange is diminished. Inflammation of lung tissue may also lead to the exudation of parts of the plasma into the alveolar space. Here, the coagulation of exudated proteins can occur and can end with the formation of a so-called hyaline membrane on the alveolar surface. Such hyaline membrane is often mainly formed by fibrin. Several diseases showing this phenomenon when histologically investigated.

Today, treatment of lung dysfunction is often performed by the administration of oxygen with a small amount of continuous positive airway pressure (CPAP), and one or more intravenous fluids are administered to stabilize the blood sugar, blood salts and blood pressure. Often the patients are subjected to artificial respiration. If the patient's condition worsens, an endotracheal tube (breathing tube) is often inserted into the trachea and intermittent breaths are given by a mechanical device. An exogenous preparation of pulmonary surfactant, either synthetic or extracted from animal lungs, can be given through the breathing tube into the lungs.

Some of the most commonly used surfactants are Survanta (or its generic form Beraksurf), derived from cow lungs, which can decrease the risk of death for very low-birth-weight infants who are hospitalized by 30% (Schwartz et al., Effect of surfactant on morbidity, mortality, and resource use in newborn infants weighing 500 to 1500 g. The New England Journal of Medicine, 1994, 330(21):1476-1480). Such small premature infants may remain ventilated for months. A study shows that an aerosol of a perfluorocarbon such as perfluoromethyldecalin can reduce inflammation in swine model of infant respiratory distress syndrome (IRDS) (von der Hardt et al., Aerosolized perfluorocarbon suppresses early pulmonary inflammatory response in a surfactant-depleted piglet model, Pediatric Research, 2002, 51(2):177-182). Chronic lung disease, including bronchopulmonary dysplasia, is common in severe respiratory distress syndrome (RDS).

The etiology of bronchopulmonary dysplasia (BPD) can be problematic and may be the result of oxygen, overventilation or underventilation. The mortality rate for babies greater than 27 weeks of gestation is less than 20%.

Extracorporeal membrane oxygenation (ECMO) is a potential treatment, providing oxygenation through an apparatus that imitates the gas exchange process of the lungs. However, newborns cannot be placed on ECMO if they are under 4.5 pounds (2 kg), because they have extremely small vessels for cannulation, thus hindering adequate flow because of limitations from cannula size and subsequent higher resistance to blood flow (compare with vascular resistance). Furthermore, in infants aged less than 34 weeks of gestation, several physiologic systems are not well-developed, especially the cerebral vasculature and germinal matrix, resulting in high sensitivity to slight changes in pH, $PaO_2$ and intracranial pressure. Subsequently, preterm infants are at unacceptably high risk for intraventricular hemorrhage (IVH) if administered ECMO at a gestational age of less than 32 weeks. (Jobe, Post-conceptional age and IVH in ECMO patients, The Journal of Pediatrics, 2004, 145(2):A2).

A method called INSURE method may be used as an approach to manage preterm neonates with respiratory distress. The method itself has been shown, through meta-analysis, to successfully decrease the use of mechanical ventilation and lower the incidence of bronchopulmonary dysplasia (BPD) (Stevens et al., Early surfactant administration with brief ventilation vs selective surfactant and continued mechanical ventilation for preterm infants with or at risk for respiratory distress syndrome, The Cochrane Database of Systematic Reviews, Cochrane Database Syst Rev., 2007, Oct. 17; (4):CD003063).

The application of diuretic substances is still under discussion (Stewart et al., Diuretics for Respiratory Distress Syndrome in Preterm Infants, Cochrane Database Syst Revs., 2011, Dec. 7, 2011(12):CD001454).

The effectivity of the methods known in the art so far is, however, limited. Further, several means for treating and preventing lung dysfunction bear severe undesired side effects and/or are laborious and expensive.

There are some hints that there is some interaction of the coagulation system and the fibrinolytic system in patients with acute respiratory distress syndrome (ARDS) in general (Ozolina et al., Activation of Coagulation and Fibrinolysis in Acute Respiratory Distress Syndrome: A Prospective Pilot Study, Front Med (Lausanne), 2016, 3:64. Published 2016 Nov. 28. doi:10.3389/fmed.2016.00064; Schouten et al., Increased mortality in elderly patients with acute respiratory distress syndrome is not explained by host response, Intensive Care Med Exp., 2019, 7(1):58. Published 2019 Oct. 29. doi:10.1186/s40635-019-0270-1).

The administration of tissue-type plasminogen activator (tPA) in a small series of COVID-19 (SARS-CoV-2 virus infection) associated acute respiratory distress syndrome (ARDS) is considered to show some beneficial technical effects (Wang et al., Tissue Plasminogen Activator (tPA) Treatment for COVID-19 Associated Acute Respiratory Distress Syndrome (ARDS): A Case Series, J Thromb Haemost, 2020 Apr. 8. doi: 10.1111/jth.14828); Moore et al., Is There a Role for Tissue Plasminogen Activator (tPA) as a Novel Treatment for Refractory COVID-19 Associated Acute Respiratory Distress Syndrome (ARDS)?, J Trauma Acute Care Surg. 2020 Mar. 20. doi: 10.1097/TA.0000000000026949). As used in the art, plasminogen activator is typically administered parenterally, i.e., as an indirect therapy which is beneficial when there is an at least a normal plasminogen level (in particular Glu-plasminogen level).

This is often used to dissolve an already formed thrombus which may cause consecutive additional tissue damages. Such therapies may fail, whenever there is an insufficient amount of plasminogen available. Such failure was found in about one third of all patients under "lysis therapy" (Stubblefield et al., Variable Resistance to Plasminogen (PLG) Activator Initiated Fibrinolysis for Intermediate-Risk Pulmonary Embolism, PLoS One, 2016 Feb. 11; 11(2): e0148747. doi: 10.1371/journal.pone.0148747. eCollection 2016.; Cullis et al., Unresolved pulmonary embolism: the role of fibrinolysis, Nucl Med Commun, 1993, 14(1):4-7).

Streptokinase or uPA are used in therapeutic setting to achieve a thrombolysis in different thrombogenic events (Kunamneni and Durvasula, Streptokinase-A Drug for Thrombolytic Therapy: A Patent Review. Recent advances in cardiovascular drug discovery, 2014, pp. 106-121; Takada and Takada, Activation pathway of Glu-plasminogen to Lys-plasmin by urokinase, Thrombosis research, 1982, pp. 671-677). The fibrinolysis is started due to the activation of plasminogen leading to the cleavage from plasminogen to plasmin (Wohl, Kinetics of activation of human plasminogen (PLG) by different activator species at pH 7.4 and 37 degrees C., The Journal of Biological Chemistry, 1980, pp. 2005-2013).

Thereby three different activation mechanisms are known (Fredenburgh and Nesheim, Lys-plasminogen is a significant intermediate in the activation of Glu-plasminogen during fibrinolysis in vitro, The Journal of Biological Chemistry, 1992, pp. 26150-26156). Plasminogen has a high binding affinity to endothelia cells and fibrin clots.

WO 2017/077380 teaches supplementation of patients, with a focus of patients suffering from non-infections metabolic diseases, by means of systemic repeated administration of plasminogen. WO 2018/162754 teaches a method for isolating Glu-plasminogen and Glu.-plasminogen for effective treatment of pathologic conditions associated with thrombotic events, wherein Glu-plasminogen is preferably administered systemically.

Also the combination of intravenous antithrombin with nebulized heparin and tissue-type plasminogen activator (tPA) in animals showed promising results. This, however, has undesired side effects. Combining intravenous recombinant human antithrombin (rhAT) with nebulized heparin and nebulized tPA more effectively restores pulmonary gas exchange, but the anti-inflammatory effects of sole rhAT are abolished with the triple therapy. Interferences between the different anticoagulants may represent a potential explanation for these findings (Rehberg et al., Advantages and pitfalls of combining intravenous antithrombin with nebulized heparin and tissue plasminogen activator in acute respiratory distress syndrome, J Trauma Acute Care Surg., 2014, 76(1):126-133).

The effect of tissue-type plasminogen activator (tPA) is however limited, in particular in patient's having strong coagulation. The levels of plasminogen in the patient are widely ignored.

On the other hand, plasminogen also has been administered to SARS-CoV-2 patients and showed some beneficial effects in some patients (Wu et al., Plasminogen improves lung lesions and hypoxemia in patients with COVID-19, published online ahead of print, 2020 Apr. 10, QJM. 2020; hcaa121. doi:10.1093/qjmed/hcaa121). Also this approach is limited due to the limited activity of plasminogen administered alone. Furthermore, the biological stability of mixed plasminogen fractions is not optimized. Mixtures of different types of plasminogen may bear significant drawbacks when administered to the patient.

WO 1998/006426 teaches administration of plasminogen activator for treating lung diseases. The administration of (Glu-)plasminogen is not taught.

In view of the above, there are still insufficient means for treating and preventing such lung dysfunctions, in particular when associated with the formation of hyaline membranes. Thus, there is still an unmet need to improve treatments of patients suffering from lung dysfunction associated with the formation of hyaline membranes and to prevent patients being as risk of developing lung dysfunction associated with the formation of hyaline membranes.

Surprisingly, it has been found that plasminogen is a beneficial agent for reducing the formation of hyaline membranes in the lung. Thus, it was found that plasminogen allows treating and preventing severe respiratory distress syndromes. In particular, administration of the patient with plasminogen and a plasminogen activator allows treating or preventing lung dysfunction associated with the formation of hyaline membranes.

One aspect of the present invention relates to plasminogen for use in a method for treating or preventing lung dysfunction associated with the formation of hyaline membranes in a patient.

The present invention also relates to a method for treating or preventing lung dysfunction associated with the formation of hyaline membranes in a patient, wherein the patient is administered with sufficient amounts of plasminogen. The formation of hyaline membranes may be optionally associated with intravascular micro-coagulation.

The present invention relates to plasminogen for use in a method for treating or preventing respiratory distress syndromes, in particular severe respiratory distress syndromes.

In a preferred embodiment, the present invention relates to plasminogen for use in a method for treating a patient suffering from lung dysfunction associated with the formation of hyaline membranes. In another embodiment, the present invention relates to plasminogen for use in a method for preventing or reducing the formation of hyaline membranes in the lung of a patient who is at risk of developing lung dysfunction associated with the formation of hyaline membranes.

Hyaline membranes are known by the person skilled in the art. In a preferred embodiment, the hyaline membranes are fibrinous plaques. The hyaline membranes may be composed of any materials that may occur in this context in a patient's lung. In a preferred embodiment, the hyaline membranes contain (beside alveolar fluid, surfactant) fibrin. In a preferred embodiment, the hyaline membranes contain at least 40% by weight (also % (w/w)), at least 50% by weight, at least 60% by weight, at least 70% by weight, at least 80% by weight, or at least 90% by weight, fibrin and water. In a preferred embodiment, the hyaline membranes contain at least 40% by weight, at least 50% by weight, at least 60% by weight, at least 70% by weight, at least 80% by weight, or at least 90% by weight, based on the dry weight, of fibrin. The hyaline membranes may be formed by exudation of plasma into the alveolar space.

In a preferred embodiment of the present invention, the lung dysfunction is associated with an inflammation of the lung or surrounding tissue, in particular inflammation of the lung. In a preferred embodiment of the present invention, the lung dysfunction is associated with exudation of plasma into the alveolar space.

As used in the context of the present invention, the term "patient" may be understood in the broadest sense as any animal including human which/who may suffer from or may be at risk of developing lung dysfunction associated with the formation of hyaline membranes. Preferably, the patient is a mammal including human, in particular a human being. It will be understood that the plasminogen is typically of the same species as the patient to be treated, in order to avoid undesired immunogenic side reactions. Likewise, it will be understood that the at least one plasminogen activator as far as administered is typically of the same species as the patient to be treated, in order to avoid undesired immunogenic side reactions.

Plasminogen may be administered to the patient alone or in combination with one or more agents supporting its function.

In a preferred embodiment, the patient is further administered with at least one plasminogen activator.

Accordingly, the present invention also relates to plasminogen for use in a method for treating or preventing lung dysfunction associated with the formation of hyaline membranes in a patient, wherein the patient is further administered with at least one plasminogen activator. As used throughout the present invention, the plasminogen activator preferably is a Glu-plasminogen activator.

Thus, the present invention also relates to plasminogen for use in a method for treating or preventing (severe) respiratory distress syndromes associated with the formation of hyaline membranes in a patient, wherein the patient is further administered with at least one plasminogen activator (e.g. tissue-type plasminogen activator (tPA)).

The present invention also refers to plasminogen for use in a method for the lysis of microthrombi and in the prophylaxis of microthrombi in the blood vessels of the lung. Thus, in a preferred embodiment of the present invention, the administration of plasminogen and optional additional administration of a plasminogen activator reduces and/or prevents microthrombi in the blood vessels of the lung. Thereby, treating or preventing lung dysfunction associated with the formation of hyaline membranes in a patient may be further supported.

The plasminogen and the at least one plasminogen activator may be each independently from another form part of each a pharmaceutical composition. In other words, the plasminogen and the at least one plasminogen activator may be each independently from another be comprised in one or more pharmaceutical compositions. Preferably, the plasminogen forms part of one pharmaceutical composition and the at least one plasminogen activator are comprised in at least two separate pharmaceutical compositions. For administration, plasminogen and the at least one plasminogen activator, respectively, may be each independently comprised in a pharmaceutical composition, i.e., is combined with least one pharmaceutically acceptable carrier.

The terms "pharmaceutical composition" and "pharmaceutical formulation" may be understood interchangeably. As used herein, the terms "pharmaceutically acceptable carrier", "pharmaceutically acceptable excipient", "carrier" and "excipient" may be understood interchangeably in the broadest sense as any substance that may support the pharmacological acceptance of the plasminogen and the at least one plasminogen activator, respectively. Such pharmaceutical composition may be ready to use and may preferably be a liquid formulation, in particular an injection portion.

The storage form may also be liquid, but may also be a dried form (e.g. a powder such as a powder comprising dried or freeze-dried plasminogen and the at least one plasminogen activator, respectively) or may be a paste or syrup or the like. Optionally, a dried form, paste or syrup may be dissolved or emulsified prior to being administered to the patient.

A pharmaceutically acceptable carrier may exemplarily be selected from the list consisting of an aqueous buffer, saline, water, dimethyl sulfoxide (DMSO), ethanol, vegetable oil, paraffin oil or combinations of two or more thereof. Furthermore, the pharmaceutically acceptable carrier may optionally contain one or more detergent(s), one or more foaming agent(s) (e.g., sodium lauryl sulfate (SLS), sodium dodecyl sulfate (SDS)), one or more coloring agent(s) (e.g., food coloring), one or more vitamin(s), one or more salt(s) (e.g., sodium, potassium, calcium, zinc salts), one or more humectant(s) (e.g., sorbitol, glycerol, mannitol, propylene glycol, polydextrose), one or more enzyme(s), one or more preserving agent(s) (e.g., benzoic acid, methylparaben, one or more antioxidant(s), one or more herbal and plant extract(s), one or more stabilizing agent(s), one or more chelating agents (e.g., ethylenediaminetetraacetic acid (EDTA), and/or one or more uptake mediator(s) (e.g., polyethylene imine (PEI), a cell-penetrating peptide (CPP), a protein transduction domain (PTD), an antimicrobial peptide, etc.).

The present invention also relates to a dosage unit of the pharmaceutical composition usable in the context of the treatment or prevention of the present invention. Exemplarily, the present invention may refer to a single dose container or to a multiple dosage form.

The means of the present invention may lead to route leads to an increased lung function (r(partial) recovery of lung function) resulting in an increased oxygen saturation.

The patient may be any patient who has a lung dysfunction associated with the formation of hyaline membranes and/or who is at risk of developing a lung dysfunction associated with the formation of hyaline membranes.

In a preferred embodiment of the present invention, the patient suffers from pneumonia associated with the formation of hyaline membranes.

In a preferred embodiment of the present invention, the lung dysfunction is pneumonia.

In a preferred embodiment of the present invention, the patient suffers from respiratory distress syndrome (IRDS). In a preferred embodiment of the present invention, the patient is an infant and suffers from respiratory distress syndrome (IRDS).

In a preferred embodiment of the present invention, the lung dysfunction associated with the formation of hyaline membranes is respiratory distress syndrome (RDS) including acute respiratory distress syndrome (ARDS), infant respiratory distress syndrome (IRDS), surfactant deficiency disorder (SDD) or hyaline membrane disease (HMD).

In a preferred embodiment of the present invention, the patient is subjected to artificial respiration (also: mechanical ventilation, mechanical respiration, artificial ventilation). In another embodiment of the present invention, the patient is not subjected to artificial respiration. In a preferred embodiment of the present invention, the patient is subjected to administration of oxygen with a small amount of continuous positive airway pressure (CPAP), and optionally one or more intravenous fluids are administered to stabilize the blood sugar, blood salts and blood pressure. In another embodiment of the present invention, the patient is not subjected to administration of oxygen with a small amount of continuous positive airway pressure (CPAP). In a preferred embodiment of the present invention, the patient is administered with an intravenous fluid to stabilize the blood sugar, blood salts and blood pressure. In another embodiment of the present invention, the patient is not administered with an intravenous fluid to stabilize the blood sugar, blood salts and blood pressure.

The lung dysfunction, in particular pneumonia, may be associated with an infection of the lung. Such infection may be viral and/or bacterial infection.

In a preferred embodiment of the present invention, the lung dysfunction is associated with a viral or bacterial infection of the lung. In a preferred embodiment of the present invention, the lung dysfunction is associated with a viral infection (also: virus infection) of the lung.

In a preferred embodiment of the present invention, the lung dysfunction associated with the formation of hyaline membranes is associated with a viral or bacterial infection of the lung. In a preferred embodiment of the present invention, in this context, the viral infection is selected from the group consisting of infections with influenza viridae (e.g., Influenza virus A, Influenza virus B), adenovirus, or cytomegalic virus, respiratory syncytial virus (RSV), human parainfluenza virus, metapneumovirus, severe acute respiratory syndrome coronavirus (SARS-CoV, SARS-CoV-1), severe acute respiratory syndrome coronavirus 2 (SARS-CoV-2), middle East respiratory syndrome virus (MERS-CoV), hantaviruses, herpes simplex virus (HSV), varicella-zoster virus (VZV), measles virus, rubella virus, cytomegalovirus (CMV), smallpox virus, dengue virus, and a combination of two or more thereof.

In a further preferred embodiment, the lung dysfunction is associated with the pathologic formation of hyaline membranes in the lung of newborns. Preferably, newborns are preterm newborns (premature birth babies).

In a further preferred embodiment, the lung dysfunction is associated with a deficient lung surfactant. In a further preferred embodiment, the lung dysfunction is associated with a deficiency of lung surfactant in a preterm newborn or in a patient suffering from a chronic inflammatory lung disease.

Such virus infection of the lung may be the infection with any virus. In particular, such virus infection of the lung is such that leads to the formation of hyaline membranes. In a preferred embodiment of the present invention, a viral infection is selected from the group consisting of infections with influenza viridae (e.g., Influenza virus A, Influenza virus B), adenovirus, or cytomegalic virus, respiratory syncytial virus (RSV), human parainfluenza virus, metapneumovirus, severe acute respiratory syndrome coronavirus (SARS-CoV, SARS-CoV-1), severe acute respiratory syndrome coronavirus 2 (SARS-CoV-2), middle East respiratory syndrome virus (MERS-CoV), hantaviruses herpes simplex virus (HSV), varicella-zoster virus (VZV), measles virus, rubella virus, cytomegalovirus (CMV), smallpox virus, dengue virus, and a combination of two or more thereof.

In a preferred embodiment of the present invention, a viral infection is selected from the group consisting of infections with influenza viridae (e.g., Influenza virus A, Influenza virus B), adenovirus, or cytomegalic virus, respiratory syncytial virus (RSV), human parainfluenza virus, metapneumovirus, severe acute respiratory syndrome coronavirus (SARS-CoV, SARS-CoV-1), severe acute respiratory syndrome coronavirus 2 (SARS-CoV-2), middle East respiratory syndrome virus (MERS-CoV), and a combination of two or more thereof. In a preferred embodiment of the present invention, a viral infection is selected from the group consisting of infections with influenza viridae (e.g., Influenza virus A, Influenza virus B), respiratory syncytial virus (RSV), and human parainfluenza virus, and a combination of two or more thereof.

In a preferred embodiment of the present invention, the lung dysfunction is associated with a bacterial infection of the lung. Such bacterial infection of the lung may be the infection with any bacteria. In particular, such bacterial infection of the lung is such that leads to the formation of hyaline membranes. In a preferred embodiment of the present invention, a bacterial infection is selected from the group consisting of infections with Pneumococci, *Haemophilus*

*influenzae, legionella* (e.g., *Legionella pneumophila*), Rickettsiea (e.g., *Coxiella burnetii*), mycoplasma (e.g., *Mycoplasma pneumoniae*), chlamydia (e.g., *Chlamydia psittaci, Chlamydia pneumoniae*), staphylococci (e.g., *Staphylococcus aureus*), enterobacteriaciae (e.g., *Escherichia coli, Klebsiella pneumonia, Pseudomonas aeruginosa*), and a combinations of two or more thereof.

In a preferred embodiment of the present invention, the lung dysfunction is associated with a mycotic infection of the lung. Such mycotic infection of the lung may be the infection with any mycotic species. In particular, such mycotic infection of the lung is such that leads to the formation of hyaline membranes. In a preferred embodiment of the present invention, a mycotic infection is selected from the group consisting of *Pneumocystis carinii, Candida species, Aspergillus* species, and a combination of two or more thereof.

In general terms, the term "plasminogen" as used in the context of the present invention relates to a plasminogen (also: PLG) and its derivatives or combinations (Glu-plasminogen (also: Glu-PLG), Lys-plasminogen (also: Lys-PLG) and/or plasmin). The structure and function of the plasminogen/plasmin system are generally known. The blood coagulation may be balanced by two inhibitors, antithrombin III and heparin cofactor II. It will be understood that a plasminogen may optionally also be recombinant or synthetic plasminogen. Glu-plasminogen may optionally also be recombinant Glu-plasminogen. Thus, (Glu-)plasminogen may optionally also be obtained by genetic engineering, including heterogenic expression.

Formed fibrin clots are only removed by activation of the fibrinolytic system. The activation of the fibrinolytic system is dependent on the plasm in activation. Human plasma contains plasminogen in several forms of activation starting with Glu-plasminogen (native), Lys-plasminogen (slightly activated) and plasmin, in its activated form. In the context of the present invention the patient may be administered with any type of plasminogen (also designated by its abbreviation: PLG). Preferably, the plasminogen has a high biological stability.

In a preferred embodiment, the plasminogen administered to the patient has no proteolytic activity.

In a preferred embodiment, plasminogen (in particular Glu-plasminogen) as used in the context of the present invention has lower proteolytic activity than plasmin. Such (essential) absence in proteolytic activity may be understood in the broadest sense as generally understood by a person skilled in the art. Preferably, the enzymatic activity of Glu-plasminogen and/or the plasminogen composition (preferably containing Glu-plasminogen) administered to the patient is below 70 units (U, i.e., µmol/min) per 1.0 g/L of total protein content, or below 10, below 9, below 8, below 7, below 6, below 5, below 2, below 1, below 0.5, below 0.1, or below 0.01 U per 1.0 g/L of total protein content. In this context, proteolytic activity may be determined by any means. For instance, it may be the activity determined by an S-2288 (Chromogenix) proteolytic activity assay. Alternatively, it may also be determined as the degradation of fibrin to D-dimers.

The specific enzyme activity of plasmin can be determined as degradation of fibrin to D-dimers. Preferably, proteolytic activity of Glu-plasminogen and/or the plasminogen composition (preferably containing Glu-plasminogen) administered to the patient is below the detection limit of the assay. A high proteolytic activity may be triggered by active enzymes such as a plasmin activator (e.g., tPA), plasmin or other active proteases which are preferably captured during the purification process. In other words, the plasminogen (in particular Glu-plasminogen) as used in the context of the present invention does preferably (essentially) not contain a proteolytic ingredient. The plasminogen (in particular Glu-plasminogen) as used in the context of the present invention does preferably (essentially) not contain tPA, plasmin or other active proteases.

In a particularly preferred embodiment, the plasminogen as used in the context of the present invention is Glu-plasminogen.

Therefore, throughout the present invention, plasminogen may be specified as being Glu-plasminogen. Glu-plasminogen may be obtained by any mean such as, e.g., as described in WO 2018/162754. As described in WO 2018/162754, Glu-plasminogen may optionally be obtained from blood plasma and plasma fractions, in particular cryo-poor plasma, cryo-poor plasma reduced by one or two absorption steps (F IX/PCC or C1-Esterase Inhibitor), Paste I-II-III or octanoic acid paste, In a preferred embodiment, the plasminogen composition administered to the patient contains Glu-plasminogen in a purity of at least 90% by weight, at least 95% by weight, at least 97% by weight, at least 98% by weight, at least 99% by weight, at least 99.5% by weight, at least 99.7% by weight, at least 99.8% by weight, or at least 99.9% by weight, based on the total protein content.

Glu-plasminogen may be understood in the broadest sense. Glu-plasminogen typically is understood as a plasma-derived proenzyme. It is known that Glu-plasm inogen has (essentially) no proteolytic activity. In a preferred embodiment, the plasminogen composition (preferably containing Glu-plasminogen) administered to the patient has (essentially) no proteolytic activity.

The selective use of Glu-plasminogen may be particularly beneficial in the context of the present invention.

In a preferred embodiment, the composition containing plasminogen (preferably containing Glu-plasminogen) administered to the patient contains no or only a very low Lys-plasminogen and plasmin content. Thus, in other words, in a preferred embodiment, the Glu-plasminogen is administered (essentially) without Lys-plasminogen. Optionally, the administered composition may comprise or may be (essentially) free of one or more other plasminogen derivatives. In a preferred embodiment, at least 50% by weight, more preferably at least 60% by weight, at least 70% by weight, at least 80% by weight, at least 90% by weight, at least 95% by weight, at least 98% by weight, at least 99% by weight, or even 100% by weight, of all plasminogen species administered to the patient is Glu-plasminogen.

In an alternative embodiment of the present invention, the Glu-plasminogen is administered in a combination of Glu-plasminogen and Lys-plasminogen and optionally one or more other plasminogen derivatives.

In this context, the term "other plasminogen derivative" may be selected from the group consisting of Glu-plasmin, Lys-plasmin, one or more Glu-plasmin fragments, one or more Lys-plasmin fragments, one or more Glu-plasminogen fragments, one or more Lys-plasminogen fragments, microplasmin, one or more microplasmin fragments, and one of the aforementioned or Glu-plasminogen or Lys-plasminogen having one or more single amino acid exchange in comparison to the predominant type in the art. In this context, "fragment" means a truncated form that lacks, one, two, three, up to five, up to ten, up to 25, up to 100, or more than 100 amino acids in the chain.

In a preferred embodiment, the compositions containing plasminogen and plasminogen activator, respectively, which are administered to the patient contains no or only a very low Lys-plasminogen content.

In an alternative embodiment, the plasminogen is Lys-plasminogen or a combination of Glu-plasminogen and Lys-plasminogen or a combination of Glu-plasminogen and Lys-plasminogen and one or more other plasminogen derivatives.

Herein, Lys-plasminogen and Glu-plasminogen may be combined in any variation. In an alternative preferred embodiment, the plasminogen is a combination of Glu-plasminogen and Lys-plasminogen and one or more other plasminogen derivatives. Herein, Lys-plasminogen and Glu-plasminogen and the one or more other plasminogen derivatives may be combined in any variation.

In a preferred embodiment, the compositions containing plasminogen and plasminogen activator, respectively, which are administered to the patient contains no or only a very low endotoxin content of below 1 EU/mL, below 0.5 EU/mL, below 0.1 EU/mL, below 0.05 EU/mL, or below 0.01 EU/mL (as determined in a Limulus Amebocyte Lysate (LAL) endosafe endochrome assay according to European Pharmacopeia (version 5.0) chapter 2.6.14).

In a preferred embodiment, the compositions containing plasminogen and plasminogen activator, respectively, which are administered to the patient contains no or only a very low immunoglobulin content of below 5 g/L, below 2 g/L, below 1 g/L, below 0.5 g/L, or below 0.1 g/L of immunoglobulins (determined in a nephelometric assay).

In a preferred embodiment, the compositions containing plasminogen and plasminogen activator, respectively, which are administered to the patient contains no or only a very low albumin content.

The plasmin activator may activate the zymogen plasminogen (e.g., Glu-plasm inogen). This may be achieved by partial cleavage of plasminogen (e.g., Glu-plasm inogen) by means of a plasminogen activator. Then, plasminogen (e.g., Glu-plasminogen) may be converted to the proteolytically active form plasmin (PM). Plasm in is involved in the fibrinolytic system, as it may degrade fibrin present in fibrin clots, the product of coagulation, to soluble fibrin degradation products/fragments which may lead to dissolution of the clot. The generation of plasmin may, for example, occur on the fibrin surface, which may offer binding sites for plasminogen and a plasminogen activator.

Such binding may further stimulate activation of plasminogen, but may also localize the activity of plasmin to sites of fibrin formation which may promote efficient clot lysis. As long as plasmin is bound to fibrin clot matrix, it is preferably not inhibited by the control inhibitor alpha-2-antiplasmin (A2AP). Released plasmin may be instantaneously inhibited. Free plasmin may have a rather short half-life period in plasma of 0.1 second(s). The half-life period of Glu-plasminogen and alpha-2-antiplasmin (A2AP) are typically in the range of several hours (often approximately 50 hours). In contrast, Lys78-plasminogen often has a rather shorter half-life period of only 20 hours (Fredenburgh and Nesheim, Lys-plasminogen is a significant intermediate in the activation of Glu-plasminogen during fibrinolysis in vitro, The Journal of Biological Chemistry, 1992, pp. 26150-26156). Plasmin may exhibit preferential cleavage at the carboxyl side of lysine and arginine residues with higher selectivity than trypsin. Plasmin may convert polymerized fibrin into soluble products (Castellino et al., Structure and function of the plasminogen (PLG)/plasmin system, Thrombosis and Haemostasis, 2005, pp. 647-654]. The at least one plasminogen activator may be any agent activating plasminogen known in the art.

In a preferred embodiment, the patient is further administered with at least one plasminogen activator. A plasminogen activator may be understood in the broadest sense as any molecular entity that activates plasminogen (in particular Glu-plasminogen). Plasminogen activators (PA) may be understood as a generic term for substances, functionally defined by activating plasminogen to plasmin and thus preferably induce fibrinolysis. Physiological PA may for instance either derive from tissues such as urinary epithelium (urokinase-type PA, uPA) and/or from vascular endothelium (tissue PA, tPA). Furthermore, PA may also be exogenous substances like streptokinase, a fibrinolytic from *Streptococcus* C.

In a preferred embodiment, the at least one plasminogen activator is selected from the group consisting of tissue-type plasminogen activator (tPA), urokinase-type plasminogen activator (uPA), single-chain urokinase plasmin activator (scuPA), anisoylated plasminogen activator (APSAC), streptokinase, and combinations of two or more thereof.

In a preferred embodiment, the at least one plasminogen activator is selected from the group consisting of tissue-type plasminogen activator (tPA), urokinase-type plasminogen activator (uPA), streptokinase, and combinations of two or more thereof.

The additional binding of a plasminogen activator (such as, e.g., tPA) may lead to an activation and plasmin formation. The mechanism may comprise binding of plasminogen on cell surface, which may be activated by a plasminogen activator to plasmin (Stricker and Wong, Activation of plasminogen (PLG) by tissue plasminogen (PLG) activator on normal and thrombasthenic platelets: effects on surface proteins and platelet aggregation, Blood, 1986, pp. 275-280).

In a preferred embodiment, the at least one plasminogen activator is selected from the group consisting of tissue-type plasminogen activator (tPA), urokinase-type plasminogen activator (uPA), and combinations thereof. In a preferred embodiment, the at least one plasminogen activator is selected from the group consisting of tissue-type plasminogen activator (tPA). tPA is typically found on and expressed in endothelial cells lining the blood vessels. It will be understood that tPA may optionally also be recombinant tPA. Thus, it may optionally also be obtained by genetic engineering, including heterogenic expression. tPA typically activates plasminogen by hydrolyzing its Arg561-Val562 peptide bond. Resulting plasmin may induce fibrinolysis. tPA may have serine-type endopeptidase activity and typically consists of a single chain. It typically has a molecular weight of 62.9 kDa.

The activation of the native plasminogen (in particular Glu-plasminogen) by means of a plasminogen activator (such as, e.g., uPA, tPA) to (Glu-)plasmin in a healthy individual is a mechanism that activates bioactivity (Stricker and Wong, Activation of plasminogen (PLG) by tissue plasminogen (PLG) activator on normal and thrombasthenic platelets: effects on surface proteins and platelet aggregation. Blood, 1986, pp. 275-280).

The terms "tissue-type plasminogen activator", "tissue plasminogen activator" and the abbreviations "tPA", "PLAT" may be understood in the broadest sense as generally understood in the art. tPA may be serine protease EC 3.4.21.68.

The terms "urokinase-type plasminogen activator", "urokinase" and he abbreviations "uPA" and "PLAU" may be understood interchangeably in the broadest sense as generally understood in the art. uPA may be serine protease EC 3.4.21.73. uPA may be a protease (serine-type endopeptidase) circulating in the blood and by binding to a cellular receptor (urokinase receptor or urokinase plasminogen activator surface receptor, uPAR), its proteolytic activity is often increased. It will be understood that uPA may optionally also be recombinant uPA. Thus, uPA may optionally also be obtained by genetic engineering, including heterogenic expression. uPA typically cleaves plasminogen bound to the cell surface and induces fibrinolysis. Binding to uPAR on the cell surface may restrict the fibrinolytic activity to the immediate vicinity of the cell membrane (Miles, et al., Plasminogen receptors. Journal of Biomedicine and Biotechnology, 2012, 130735. doi: 10.1155/2012/130735). Human uPA typically has a molecular weight of around 48.8 kDa and consists of two chains. It is typically expressed in prostate gland. uPA also includes single-chain urokinase plasmin activator (scuPA).

The term "streptokinase" and its abbreviation "SK" may be understood interchangeably in the broadest sense as generally understood in the art. Streptokinase may be endoprotease EC 3.4.21). Streptokinase may be obtained from or may originate from β-hemolyzing *Streptococcus*. It will be understood that streptokinase may optionally also be recombinant streptokinase. Thus, streptokinase may optionally also be obtained by genetic engineering, including heterogenic expression. It is only active upon binding plasminogen and generating an active complex. This activity converts the zymogen plasminogen to its active enzyme plasmin.

All examples of above-mentioned plasminogen activators (i.e., uPA, tPA and streptokinase) have similar functionalities, and all are meant to be a supportive substance to increase the activity of administered plasminogen for the use indicated in the present invention.

In view of the above, the present invention also relates to Glu-plasminogen for use in a method for treating or preventing lung dysfunction associated with the formation of hyaline membranes in a patient, wherein the patient is further administered with at least one plasminogen activator selected from the group consisting of tissue-type plasminogen activator (tPA), urokinase-type plasminogen activator (uPA), streptokinase, and combinations of two or more thereof.

In a further embodiment, a plasminogen activator may also be an inhibitor of the plasminogen activator inhibitor type-1 (PAI-1). Such PAI-1 may be such according to Charlton et al. (Thromb. Haemost, 1996, 75(5):808-815).

The patient may be any patient suffering from or being at risk of lung dysfunction associated with the formation of hyaline membranes. It was found that the treatment in the context of the present invention is particularly beneficial when the patient has a plasminogen deficiency. In a preferred embodiment, plasminogen deficiency as used throughout the present invention is Glu-plasminogen deficiency.

In a preferred embodiment, the patient bears a plasminogen deficiency. In a preferred embodiment, the patient has a lower blood level of plasminogen (in particular a lower blood level of Glu-plasminogen) than the blood level of (Glu-)plasminogen found throughout population of the same species.

As used herein, plasminogen deficiency may have any cause and may be plasminogen deficiency of any type.

In a preferred embodiment, the plasminogen deficiency is acquired plasminogen deficiency or innate plasminogen deficiency. In a preferred embodiment, the plasminogen deficiency is acquired plasminogen deficiency caused by increased plasminogen consumption, decreased biosynthesis of plasminogen, or a combination of both.

In a preferred embodiment, the plasminogen deficiency is acquired Glu-plasminogen deficiency, in particular Glu-plasminogen deficiency or innate Glu-plasminogen deficiency. In a preferred embodiment, the Glu-plasminogen deficiency is acquired Glu-plasminogen deficiency caused by increased Glu-plasminogen consumption, decreased biosynthesis of Glu-plasminogen, or a combination of both.

In a preferred embodiment, patient bears an acquired plasminogen (in particular Glu-plasminogen) deficiency. In a preferred embodiment, patient bears an acquired plasminogen (in particular Glu-plasminogen) deficiency caused by increased plasminogen (in particular Glu-plasminogen) consumption (consumption hypofibrinolysis). Plasminogen (in particular Glu-plasminogen) consumption may be due to transformation of the plasminogen (in particular Glu-plasminogen) to plasmin. This may have any reason, for instance, by a long-term activation of the fibrinolytic system such as, e.g., due to clot formation and/or damage of one or more blood vessels' inside, the intima.

In a preferred embodiment, plasminogen is Glu-plasminogen and the patient bears an acquired Glu-plasminogen deficiency. In a preferred embodiment, plasminogen is Glu-plasminogen and the patient bears an acquired Glu-plasminogen deficiency caused by increased Glu-plasminogen consumption.

Plasminogen consumption may have any reason. For example, the reason for a consumption of plasminogen may be the permanent or repeated formation of large number of microthrombi in blood vessels (anywhere in the patient's body, not only in the lung), and/or the loss of plasma proteins due to the exudative inflammation in the lung, the formation of the hyaline membranes and the initiated lysis which may optionally exceed the capacity of the plasminogen present in plasma.

In a preferred embodiment, patient bears a decreased biosynthesis of plasminogen. In a preferred embodiment, patient bears a decreased biosynthesis of Glu-plasminogen. For instance, such decreased biosynthesis may be caused by decreased expression of messenger ribonucleic acid (mRNA) encoding for plasminogen, in particular Glu-plasminogen, erroneous splicing of such mRNA, reduced translation of the mRNA into the respective polypeptide, accelerated intracellular degradation of mRNA and/or the respective polypeptide, or a combination of two or more thereof.

As used herein, the terms "increased" and "decreased" refer to a comparison with the average of a healthy population.

Preferably, "increased" may be a value that is at least 5%, at least 10%, at least 25%, at least 50% or at least 2 fold higher than the average in a healthy population. Preferably, "decreased" may be a value that is at least 5%, at least 10%, at least 25%, or at least 50% lower than the average in a healthy population.

As used herein, an acquired plasminogen (in particular Glu-plasminogen) deficiency may be understood in the broadest sense as a shortage of (Glu-)plasminogen as, for instance, acquired during patent's live. Thus, such (Glu-)plasminogen deficiency differs from an innate (plasminogen (in particular Glu-plasminogen) deficiency. Preferably, an acquired plasminogen (in particular Glu-plasminogen) deficiency is caused by increased plasminogen (in particular Glu-plasminogen) consumption.

Such plasminogen (in particular Glu-plasminogen) consumption may be caused by events in the patient's body as described herein.

The patient may be administered with the plasminogen and the at least one plasminogen activator by any means known in the art.

In a preferred embodiment, the administration of at least parts of the plasminogen or the at least one plasminogen activator to the patient is performed by inhalation.

As used herein, inhalation may be any kind of inhalation. Inhalation may be inhalation by means of a spray. Inhalation may be atomization or any other kind of nebulizer.

In a preferred embodiment, the administration of the plasminogen is performed by inhalation. Without being bound to this theory, it is assumed that, due to the fact that the hyaline membranes are not that close to the blood capillaries, a local application via inhalation is surprisingly successful. The plasminogen and the at least one plasminogen activator, respectively, may be each independently from another administered to the patient by any means. The plasminogen and the at least one plasminogen activator, respectively, may be each independently from another administered to the patient systemically.

Plasminogen and the at least one plasminogen activator, respectively, may be each independently from another administered to the patient by an administration route selected from the group consisting of inhalation, intravenous (i.v.), intraarterial (i.a.), intracranial (i.c.), intraperitoneal (i.p.), intramuscular (i.m.), and subcutaneous (s.c.) injection), in particular by an administration route selected from the group consisting of intravenous (i.v.), intramuscular (i.m.), and subcutaneous (s.c.) injection). Alternatively or additionally, a pharmaceutical composition containing the plasminogen and the at least one plasminogen activator, respectively, may also be suitable for other routes of administration such as, e.g., nasal or transdermal administration.

The components may be administered either simultaneously or subsequently. It may, exemplarily, be performed by inhaling only the plasminogen (in particular Glu-plasminogen) and/or at least one plasminogen activator and parenteral application (preferably intravenously) of the second drug or even by the parenteral application of both. As used herein, parental administration may be understood in the broadest sense.

In a preferred embodiment, at least parts of (Glu-)plasminogen is administered to the patient by means of inhalation. In another preferred embodiment, parts of (Glu-)plasminogen is administered to the patient by means of inhalation and other parts of (Glu-)plasminogen are administered by means of injection, in particular intravenous administration. The latter can also be designated as combined administration (inhalation/injection).

In a preferred embodiment, at least parts of the plasminogen activator is administered to the patient by means of inhalation. In another preferred embodiment, parts of plasminogen activator is administered to the patient by means of inhalation and other parts of plasminogen activator are administered by means of injection, in particular intravenous administration. The latter can also be designated as combined administration (inhalation/injection).

In a preferred embodiment, the patient is administered according to one of the following administration schemes:
(i) administration by means of inhalation with the plasminogen and administration by means of inhalation with the at least one plasminogen activator;
(ii) administration by means of inhalation with the plasminogen and parenteral administration with the at least one plasminogen activator;
(iii) parenteral administration with the plasminogen and administration by means of inhalation with the at least one plasminogen activator; or
(iv) parenteral administration with the plasminogen and parenteral administration with the at least one plasminogen activator;
(v) a sequential combination of two or more of (i) to (iv); and/or wherein the plasminogen and the at least one plasminogen activator are both administered to the patient within one hour.

As used herein, parenteral administration is preferably intravenous (i.v.), intraarterial (i.a.), intracranial (i.c.), intraperitoneal (i.p.), intramuscular (i.m.), and subcutaneous (s.c.) injection), preferably by an administration route selected from the group consisting of intravenous (i.v.), intramuscular (i.m.), and subcutaneous (s.c.) injection), in particular intravenous (i.v.), administration.

In a preferred embodiment, the patient is administered according to one of the following administration schemes:
(i) administration by means of inhalation of Glu-plasminogen and administration by means of inhalation of at least one plasminogen activator (e.g., tPA);
(ii) administration by means of inhalation of Glu-plasminogen and intravenous administration of at least one plasminogen activator (e.g., tPA); or
(iii) intravenous administration of Glu-plasminogen and administration by means of inhalation of at least one plasminogen activator (e.g., tPA).

In a preferred embodiment, the patient is administered with single doses each in the range of 0.01 to 100 mg/kg body weight of the plasminogen and single doses each in the range of 0.01 to 100 mg/kg body weight of the at least one plasminogen activator, preferably wherein the patient is administered with both the plasminogen and the at least one plasminogen activator once per day for a time period of three or more days.

In a preferred embodiment, the patient is administered with a plasminogen dose suitable to replace not more than 50%, not more than 40%, not more than 30%, not more than 20%, not more than 15%, not more than 10%, or not more than 5%, of the normal plasminogen amount in the plasma compartment.

As used herein, the normal (Glu-)plasminogen amount in the plasma compartment preferably corresponds to the average level found throughout population of the same species. It was found that the (Glu-)plasminogen level in a population of healthy individuals varies between 80 and 120% (mol/mol) of the average level found throughout population of the same species.

In a preferred embodiment, the level of plasminogen (in particular a lower blood level of Glu-plasminogen) in the patient's blood is determined and, in case the determined level of plasminogen (in particular a lower blood level of Glu-plasminogen) is at least 10% (mol/mol), at least 20% (mol/mol), at least 30% (mol/mol), at least 40% (mol/mol), or at least 50% (mol/mol) lower in comparison to the average level found throughout population of the same species, the patient is administered with a sufficient amount of plasminogen to prevent or treat the lung dysfunction.

In a preferred embodiment, the level of Glu-plasminogen in the patient's blood is determined and, in case the determined level of Glu-plasminogen is at least 10% (mol/mol)), at least 20% (mol/mol), at least 30% (mol/mol), at least 40% (mol/mol), or at least 50% (mol/mol) lower in comparison to the average level found throughout population of the same species, the patient is administered with a sufficient amount of Glu-plasminogen to prevent or treat the lung dysfunction.

In a preferred embodiment, the patient is:
(a) administered at least once with a dose of 0.01 to 100 mg/kg body weight of the plasminogen and at least once with a dose of 0.01 to 100 mg/kg body weight of the at least one plasminogen activator during the treatment period; and subsequently
(b) the level of plasminogen (in particular a lower blood level of Glu-plasminogen) and plasminogen activator in the patient's blood is determined in a step (i) and, in case the determined level of plasminogen (in particular a lower blood level of Glu-plasminogen) is at least 10% (mol/mol) lower in comparison to the average level found throughout population of the same species, the patient is administered with a sufficient amount of plasminogen and optionally a sufficient amount of the at least one plasminogen activator for treating or preventing the lung dysfunction in a further step (ii), and optionally
(c) steps (i) and (ii) are conducted repeatedly as long as the level of plasminogen (in particular a lower blood level of Glu-plasminogen) determined in step (i) is at least 10% (mol/mol) lower in comparison to the average level found throughout population of the same species.

In a preferred embodiment, the patient is:
(a) administered with the combination of plasminogen (PLG) and one of its activators at least once with a dose of plasminogen (PLG) in the range of 0.01 to 100 mg/kg body weight during the treatment period; and subsequently
(b) the level of plasminogen (in particular a lower blood level of Glu-plasminogen) in the patient's blood is determined in a step (i) and, in case the determined level of plasminogen (PLG, in particular a lower blood level of Glu-plasminogen) is at least 10% (mol/mol) lower in comparison to the average level found throughout population of the same species, the patient is administered with a sufficient amount of plasminogen to prevent or treat a thrombotic event in a further step (ii), and optionally
(c) steps (i) and (ii) are conducted repeatedly as long as the level of plasminogen (in particular a lower blood level of Glu-plasminogen) determined in step (i) is at least 10% (mol/mol) lower in comparison to the average level found throughout population of the same species.

Further preferred dose ranges and treatment intervals are described herein.

The dose range may be adjusted to the intended use. In a preferred embodiment, the patient is administered with plasminogen at least once with a dose of plasminogen in the range of 0.01 to 100 mg/kg body weight. In a preferred embodiment, the patient is administered with plasminogen at least once with a dose of plasminogen in the range of 0.01 to 1 mg/kg body weight.

In a preferred embodiment, the patient is administered with plasminogen at least once with a dose of the at least one plasminogen activator in the range of 0.01 to 100 mg/kg body weight, or 0.1 to 20 mg/kg body weight. The dose of a plasminogen activator may be in the range of 0.1 to 20 mg every 4 hours, applied either subsequently or simultaneously.

In a preferred embodiment, the patient is administered with at least once with a dose of plasminogen in the range of 0.01 to 0.1 mg/kg body weight, 0.05 to 0.5 mg/kg body weight, 0.1 to 1 mg/kg body weight, 0.5 to 5 mg/kg body weight, 1 to 10 mg/kg body weight, or 1 to 100 mg/kg body weight. The dose of each of the at least one plasminogen activator may be in the range of 0.1 to 20 mg every 4 hours, applied either subsequently or simultaneously.

In a preferred embodiment, a single dose of plasminogen administered intravenously is in the range of 0.01 to 1 mg/kg. Preferably, a single dose of plasminogen administered intravenously is in the range of 0.02 to 0.9 mg/kg, 0.03 to 0.8 mg/kg, 0.04 to 0.7 mg/kg, 0.05 to 0.5 mg/kg, 0.1 to 0.4 mg/kg, or 0.25 to 0.35 mg/kg. The dose of each of the at least one plasminogen activator may be in the range of 0.1 to 20 mg every 4 hours, applied either subsequently or simultaneously.

In a preferred embodiment, a single dose of plasminogen administered intramuscularly is in the range of 0.05 to 10 mg/kg. Preferably, single dose of plasminogen administered intramuscularly is in the range of 0.1 to 9 mg/kg, 0.2 to 8 mg/kg, 0.3 to 7 mg/kg, or 0.5 to 5 mg/kg. The dose of each of the at least one plasminogen activator may be in the range of 0.1 to 20 mg every 4 hours, applied either subsequently or simultaneously.

In a preferred embodiment, a single dose of plasminogen administered subcutaneously is in the range of 0.1 to 100 mg/kg. Preferably, single dose of plasminogen administered subcutaneously is in the range of 0.5 to 90 mg/kg, 1 to 80 mg/kg, 2 to 70 mg/kg, or 5 to 50 mg/kg. The dose of each of the at least one plasminogen activator may be in the range of 0.1 to 20 mg every 4 hours, applied either subsequently or simultaneously.

In a preferred embodiment, a single dose of plasminogen administered by inhalation is in the range of 0.1 to 100 mg/kg. Preferably, single dose of plasminogen administered by inhalation is in the range of 0.5 to 90 mg/kg, 1 to 80 mg/kg, 2 to 70 mg/kg, or 5 to 50 mg/kg. The dose of each of the at least one plasminogen activator may be in the range of 0.1 to 20 mg every 4 hours, applied either subsequently or simultaneously.

In a preferred embodiment, a single dose of plasminogen administered parenterally is in the range of 0.1 to 100 mg/kg. Preferably, single dose of plasminogen administered by inhalation is in the range of 0.5 to 90 mg/kg, 1 to 80 mg/kg, 2 to 70 mg/kg, or 5 to 50 mg/kg. The dose of each of the at least one plasminogen activator may be in the range of 0.1 to 20 mg every 4 hours, applied either subsequently or simultaneously.

In a preferred embodiment, a single dose of plasminogen administered by inhalation is in the range of 0.1 to 100 mg/kg. Preferably, single dose of plasminogen administered by inhalation is in the range of 0.5 to 90 mg/kg, 1 to 80 mg/kg, 2 to 70 mg/kg, or 5 to 50 mg/kg. The dose of each of the at least one plasminogen activator may be in the range of 0.1 to 20 mg every 4 hours, applied either subsequently or simultaneously.

In a preferred embodiment, the patient is administered with plasminogen at least once within 24 hours after the occurrence of an acute respiratory distress event. In a preferred embodiment, the patient is administered with plasminogen at least once within twelve hours or at least within six, five or four hours after the occurrence of the event.

In a further preferred embodiment, the patient is administered on a regular basis when being at risk of developing an acute respiratory distress event.

As used herein, the term "on a regular basis" may be understood in the broadest sense as lasting for a time period of at least a week, at least a month, at least six months, or at least a year. Such event of high risk of developing a lung dysfunction such as, e.g., acute respiratory distress syndrome, may be any event that increases the risk of the patient for obtaining such lung dysfunction. In a preferred embodiment, such event is a surgical intervention. The patient may be administered with plasminogen according to any administration scheme.

In a further preferred embodiment, the patient is administered within one week before being subjected to an event of high risk of developing an acute respiratory distress event.

In a preferred embodiment, the patient is administered with the combination of plasminogen and one of its activators once per day for a time period of three or more days. Preferably, the patient is administered with plasminogen once per day for a time period of at least a week, for at least two weeks, at least four weeks, at least two months, or at least a year. In a preferred embodiment, the patient is administered is intravenously with plasminogen once per day for a time period of three or more days, at least a week, for at least two weeks, at least four weeks, at least two months, or at least a year. In this context, a single dose may be a single dose in any dose range. In a preferred embodiment, administration of a single dose may be each in the range of 0.01 to 1 mg/kg body weight. Further preferred dose ranges are described herein.

In a preferred embodiment, the patient is administered with the combination of plasminogen and one of its activators once per day for a time period of three or more days, wherein administration is intravenous administration, wherein intravenous administration of a single dose may be each in the range of 0.01 to 1 mg/kg body weight. Further preferred dose ranges are described herein.

In a preferred embodiment, the patient is administered with the combination of plasminogen and one of its activators once per day for a time period of three or more days, preferably wherein administration is intraarterial administration, in particular intraarterial administration of a single dose each in the range of 0.01 to 1 mg/kg body weight. In a preferred embodiment, the patient is administered with plasminogen (PLG) once per day for a time period of three or more days, preferably wherein administration is intracranial administration, in particular intracranial administration of a single dose each in the range of 0.01 to 1 mg/kg body weight.

In a preferred embodiment, the patient is administered with the combination of plasminogen and one of its activators once every two days for a time period of three or more days. Preferably, the patient is administered with plasminogen every two days for a time period of at least a week, for at least two weeks, at least four weeks, at least two months, or at least a year. In a preferred embodiment, the patient is administered intramuscularly or intravenously, in particular intramuscularly, with plasminogen once per day for a time period of three or more days, at least a week, for at least two weeks, at least four weeks, at least two months, or at least a year.

In this context, a single dose may be a single dose in any dose range. In a preferred embodiment, administration of a single dose may be each in the range of 0.05 to 10 mg/kg body weight. Further preferred dose ranges are described herein. In a preferred embodiment, the patient is administered with plasminogen once per day for a time period of three or more days, wherein administration is intramuscular administration, wherein intravenous administration of a single dose may be each in the range of 0.05 to 10 mg/kg body weight. Further preferred dose ranges are described herein.

In a preferred embodiment, the patient is administered with the combination of plasminogen and one of its activators once every week for a time period of three or more weeks. Preferably, the patient is administered with plasminogen once every week for a time period of at least two weeks, at least four weeks, at least two months, or at least a year.

In a preferred embodiment, the patient is administered subcutaneously with plasminogen once every week for a time period of three or more weeks, at least two weeks, at least four weeks, at least two months, or at least a year. In this context, a single dose may be a single dose in any dose range. In a preferred embodiment, administration of a single dose may be each in the range of 0.1 to 100 mg/kg body weight. Further preferred dose ranges are described herein.

In a preferred embodiment, the patient is administered with plasminogen once every week for a time period of three or more weeks, wherein administration is subcutaneous administration of a single dose in the range of 0.1 to 100 mg/kg body weight. Further preferred dose ranges are described herein. In a preferred embodiment, the patient is administered with a dose suitable to replace not more than 15% of the normal plasminogen amount in the plasma compartment. Further preferred dose ranges are described herein. In a preferred embodiment, the patient is administered with a dose suitable to replace not more than 10% of the normal plasminogen amount in the plasma compartment. Further preferred dose ranges are described herein.

In a preferred embodiment, the patient is administered with a dose suitable to replace not more than 5% of the normal plasminogen amount in the plasma compartment. Further preferred dose ranges are described herein.

In a preferred embodiment, the patient is administered once per day for a time period of three to seven days and is subsequently administered once every two days for a time period of three or more days. In an alternative preferred embodiment, the patient is administered once per day for a time period of three to seven days and is subsequently administered once per week for a time period of three or more weeks. In an alternative preferred embodiment, the patient is administered once per day for a time period of three to seven days and is subsequently administered once every two days for a time period of three or more days and is the, subsequently, administered once per week for a time period of three or more weeks.

Prior to administration, the level of plasminogen (in particular a lower blood level of Glu-plasminogen) in the patient's blood may be determined. In case the determined level of plasminogen (in particular a lower blood level of Glu-plasminogen) is at least 10% (mol/mol) lower in comparison to the average level found throughout population of the same species, the patient may be administered with a sufficient amount of plasminogen to prevent or treat a thrombotic event.

In addition to the administration of the plasminogen and the at least one plasminogen activator according to the present invention, the patient may be further administered with one or more further agents supporting such activity.

In a preferred embodiment of the present invention, the patient is further administered with a pharmaceutical compound selected from the group consisting of anticoagulants, non-steroidal anti-inflammatory agents, anti-inflammatory steroidal agents, interferon beta, antiviral agents, antibiotics, chloroquine, hydroxychloroquine, nucleoside analogues, nucleotide analogues, perfluorocarbon, and a combination of two or more thereof.

The following examples and claims further illustrative the invention. These examples are not intended to provide any limitation on the scope of the invented subject-matter.

EXAMPLES

Preparation of Glu-Plasminogen Preparations

Glu-plasminogen was prepared as described in Experimental Example 1 of WO 2018/162754 with a purity of >95% by weight based on the total protein content. The human Glu-plasminogen preparation contained 1256 µg/mL of Glu-plasm inogen (as determined by enzyme-linked immunosorbent assay, ELISA). The total protein content of said preparation was 1259 µg/mL (as determined by Bradford protein assay). Accordingly, the purity of Glu-plasminogen was found to be >99.7% by weight, based on total protein content.

The high purity was also confirmed by sodium dodecyl sulfate-polyacrylamide gel electrophoresis (SDS-PAGE). Proteolytic activity of the Glu-plasminogen (as determined by a standardized S-2288 (Chromogenix) proteolytic activity assay, referred to the total protein content, units/1.0 g/L of total protein content) was found below the detection limit.

The human Glu-plasminogen preparation contained only a negligible endotoxin level of <<1 EU/mL (as determined in a Limulus Amebocyte Lysate (LAL) endosafe endochrome assay according to European Pharmacopeia (version 5.0) chapter 2.6.14), and <0.35 g/L IgG, <0.05 g/L IgA and <0.35 g/L IgM (each determined in a nephelometric assay). Albumin (as determined by a polychromatic endpoint determination) and Lys-plasminogen (as determined by Western Blot) were not detectable.

In a further test of bioactivity, the concentration of the human Glu-plasminogen was set to 200 µg/mL and was then activated to plasmin. This corresponding to a concentration range naturally occurring in blood. The proteolytic activity of the obtained plasmin solution was determined by means of a para-nitrophenol-labeled (pNP-labeled) peptide substrate of plasmin. It was found that proteolytic plasmin activity was in a range of 109% in comparison to the activity naturally occurring in blood plasma plasmin proteolytic activity which was normalized to be 100%. Therefore, it was found that the human Glu-plasminogen was fully bioactive and could be converted in fully active plasmin.

Example I Animal Model for the Formation of Microthrombi in Organ Failures

It was shown by Wade-Evans et al (Wade-Evans: Pulmonary Hyaline membranes, Aspiration and Pneumonia, Arch. Dis. Child., 1961, 36(187):293-301) that the formation of microthrombi may play a role in the pathogenesis of a lung insufficiency. Therefore, an animal model of microthrombi was used. The general pathogenesis of organ failures often includes the formation of microthrombi. In the lungs, the formation of hyaline membranes is a special additional effect. To prove the efficacy of Glu-plasminogen a microthrombi-based organ failure model is selected by using the formation of those thrombi in the kidney after the injection of cholesterol crystals into the arteria renalis. It was shown that plasminogen enabled the prevention of microthrombi in organs of an animal. In a second model (Example II) the dissolution of fibrin in a solid phase model was selected to simulate the formation of hyaline membranes.

Triggering the Formation of Microthrombi in the Kidney

Mice were administered with cholesterol (CC) by means of an injection of 10 mg/kg, 100 µL/mouse in a blood vessel leading to the kidney. The time point of injection was considered as time point zero (0 hours). It was found that cholesterol leads to the formation of clots in smaller vessels in the kidney, in particular in kidney capillaries.

Treatment with Plasminogen (PLG)

Glu-plasminogen was prepared as described in Experimental Example 1 of WO 2018/162754 with a purity of >95% by weight. The properties were those as described above. Some of the mice remained untreated. Those which were treated were administered with an intravenous (i.v.) injection of 132 µL/mouse of a composition containing 65 µg/mL Glu-plasminogen in phosphate buffered saline 4 hours after cholesterol administration. The Injection of phosphate buffered saline after 4 hours of cholesterol administration was used as a control group, with no treatment. As an additional control group, the injection of PBS instead of CC and the injection of 132 µL/mouse of a composition containing 65 µg/mL Glu-plasminogen in phosphate buffered saline was analyzed after 4 hours.

Readout 24 hours after cholesterol administration, the glomerular filtration rate (GFR) was determined. Further, the infarct size in kidney was determined by means of staining with triphenyl tetrazolium chloride (TTC) of the kidney tissue. Further, the sacrificed mice were examined histologically, e.g., by means of determining the score the tubular injury (PAS), the endothelial injury (CD31) and the neutrophil immunocyte filtration.

Results and Discussion

Cholesterol administration was found to cause microthrombi. These were also found in histological observation of the mice kidney after 24 hours. These microthrombi were found to have a significant effect on the glomerular filtration rate (GFR) (samples including cholesterol (CC)) and causes necrosis of more than half (50%) of the kidney tissue (samples including only cholesterol (CC)). Administration of (Glu-)plasminogen alone was not found to have a significant impact on the glomerular filtration rate (GFR). It does also not restore glomerular filtration rate (GFR) effected by microthrombi caused by cholesterol administration (samples including cholesterol (CC) and (Glu-)plasminogen (Glu-PLG).

However, administration of (Glu-)plasminogen effectively prevented necrosis of the tissue (samples including cholesterol (CC) and (Glu-)plasminogen (Glu-PLG). Necrosis was reduced by the half in comparison to the necrosis found when only cholesterol is administered. Thus, (Glu-)plasminogen effectively reduced infarct size.

These results show that the administration of (Glu-)plasminogen effectively treats and prevents a patient suffering from (micro)thrombi.

The (Glu-)plasminogen produced according to this invention has surprisingly a high and excellent fibrinolytic activity in (micro)thrombotic events. Without being bound to this theory, it is assumed that (Glu-)plasminogen resolves existing microthrombi and can be used in the prophylaxis of micro- and/or macro-thrombotic events. Such (micro)thrombotic events are often causal in infarctions such as, e.g., myocardial infarctions, strokes as well at kidney infarctions, a retinal vein occlusion, thrombotic thrombocytopenic purpura, etc.

Example II

Solid Phase Fibrin Degradation Assay as a Model for Hyaline Membrane Lysis

In a second model (Example II) the dissolution of fibrin in a solid phase model was selected to simulate the formation of hyaline membranes.

Setup of an In Vitro Solid Phase—Fibrin System

Prior to coating 96-well plates with fibrinogen, 2.9 nmol fibrinogen were biotinylated with 290 nmol D-biotin-N-succinimidyl ester in a carbonate buffer pH 9.5.

The biotin-labeled fibrinogen (100 μL) was incubated on three empty 96-well flat bottom microtiter plates (Greiner Bio-One GmbH, Germany) at 37° C. After 2 hours, immobilized biotin-labeled fibrinogen was converted to fibrin by adding 100 μL thrombin solution (1 U/mL in 0.15 mol/L TRIS pH 7.4 with 5 mM $CaCl_2$)) and incubation overnight.

For detectability, a fibrin-HRP conjugate (HRP—horseradish peroxidase) was created utilizing the biotin-streptavidin affinity by adding 100 μL streptavidin-labeled HRP solution (1:20,000 in washing buffer+0.05% bovine serum albumin) for 30 minutes at 37° C.

Treatment with Tissue-Type Plasminogen Activator-(tPA)-Activated Plasminogen

After washing with TRIS pH 7.4, the fibrin-coated microtiter plates were treated with different plasminogen (PLG) concentrations. All plasminogen samples, regardless of the concentration, were activated with 33.3 nM tPA or 66.3 nM tPA. The plasminogen samples were derived from an in-house purified Glu-plasminogen (see above) and a Glu-plasminogen standard (CoaChrom Diagnostica GmbH, Austria), both with known concentrations. Dilution series of the samples (200 μL) along with the activator tPA were added to the microtiter plates and were incubated for 2 hours at 37° C. As internal standard, a dilution series of the active enzyme plasmin (CoaChrom Diagnostica GmbH, Austria) was run in parallel on each microtiter plate.

Readout

After 2 hours incubation time, 50 μL of the supernatant of each well were transferred to new 96-well microtiter plates. 100 μl tetramethylbenzidine (TMB) solution (SeramunBlau® fast, Seramun Diagnostica GmbH, Germany) per well were added as the chromogenic substrate solution for the HRP-conjugates and incubated for 30 min at room temperature. The reaction was stopped with 100 μL 1 M $H_2SO_4$ and the resulting yellow solution was measured at 450 nm in a Multiskan™ FC Microplate Photometer (Thermo Fisher Scientific Inc., USA).

Results

The resulting $OD_{450}$ values from the samples with the activated Glu-plasminogen standard (GluStand+) and the $OD_{450}$ values for the internal standard of the already active enzyme plasmin obtained as parallel results within one microtiter plate (plate 3).

One dilution series of GluStand+ was activated with 33.3 nM tPA and one dilution series of GluStand+ was activated with 66.6 nM tPA. The absorption values represent the amount of solubilized fibrin degradation products as found in the supernatant, thus mirror the plasm in activity. As can be seen from a comparison of the values obtained with activated plasminogen (GluStand+) and already active plasm in it is not possible to activate the whole content of plasminogen into the active form plasmin.

This effect is independent of the concentration of the added activator tPA because similar results were obtained for the samples with 33.3 nM tPA and with 66.6 nM tPA. Nevertheless, the assay showed the successful lysis of fibrin immobilized at a solid phase which can be taken as an in vitro model for hyaline membranes.

To assess the potency of the used plasminogen samples, the resulting plasmin amount (converted from plasminogen) was calculated using the standard plasmin curve.

Table 1 shows the calculated molar plasm in concentrations [nM] of all plasminogen dilution series obtained for the GluStandard+(activated Glu-plasminogen standard (CoaChrom)—33.3 nM tPA and 66.6 nM tPA) and Glu+(activated in-house purified Glu-plasminogen—33.3 nM tPA and 66.6 nM tPA) obtained for the samples in three microtiter plates (plate 1, plate 2, plate 3).

TABLE 1

Calculated molar plasmin concentrations

| PLG [nM] | Glu+ 33.3 nM tPA plate 1 | Glu+ 66.6 nM tPA plate 1 | Glu+ 33.3 nM tPA plate 2 | Glu+ 66.6 nM tPA plate 2 | Glu+ 33.3 nM tPA plate 3 | Glu+ 66.6 nM tPA plate 3 |
|---|---|---|---|---|---|---|
| 326.09 | 94.37 | 104.35 | 54.81 | 65.84 | 155.26 | 194.00 |
| 163.04 | 54.31 | 63.07 | 31.06 | 36.41 | 75.60 | 56.97 |
| 81.52 | 42.61 | 48.90 | 22.66 | 27.32 | 38.01 | 55.86 |
| 40.76 | 35.75 | 41.37 | 17.25 | 20.19 | 36.65 | 38.03 |

| PLG [nM] | GluStand+ 33.3 nM PA plate 1 | GluStand+ 66.6 nM tPA plate 1 | GluStand+ 33.3 nM tPA plate 2 | GluStand+ 66.6 nM tPA plate 2 | GluStand+ 33.3 nM tPA plate 3 | GluStand+ 66.6 nM tPA plate 3 |
|---|---|---|---|---|---|---|
| 326.09 | 83.29 | 100.61 | 74.33 | 77.61 | 105.56 | 113.16 |
| 163.04 | 52.99 | 66.29 | 46.87 | 60.98 | 64.44 | 81.38 |
| 81.52 | 32.47 | 34.30 | 30.91 | 39.29 | 31.56 | 47.52 |
| 40.76 | 29.25 | 31.34 | 17.50 | 24.81 | 24.01 | 31.65 |

There was no detectable lysis of plasmin without administration of Glu-plasminogen.

Further the inter assay reproducibility was evaluated comparing the single plasmin standard curves from each plate and respective Glu-plasminogen curves. An analysis of variance (ANOVA) with $\alpha=0.05$ was performed.

The analysis, with F=0.18<3.09=F crit. accepted the null hypothesis ($\mu_1=\mu_2=\mu_3$), showed no significant difference between assay/plates.

Furthermore, statistical analysis (Equal variance t-Test) showed no significant difference ($p_{(t-test)}=0.59>0.05=\alpha$) in plasmin activity profile after activation with tPA, between the in-house purified Glu-plasminogen sample and a Glu-plasminogen standard.

Example III

Fibrin Degradation Assay as a Model for Large Hyaline Membrane Lysis—Human In Vitro 3D Fibrin (Cross-Linked) Clot In a further model, the dissolution of fibrin in a solid phase model was selected to simulate the formation and lysis of hyaline membranes.

First, 125 μL of human fibrinogen (32 mg/mL) were diluted in 1 mL of 10 mmol/L TRIS buffer, 150 mmol/L NaCl, pH 7.4, to obtain a final concentration of 4 mg/mL in an Eppendorf tube. 200 μL of 10 mmol/L TRIS buffer, 150 mmol/L NaCl, 5 mmol/L $CaCl_2$), pH 7.4, with 1 U/mL of human thrombin and 1.5 U/mL of human Factor XIII were added into the tube with the fibrinogen solution. The whole mixture was incubated for 30 min at room temperature (RT), although it was mostly solid after only 10 min. Afterwards, 200 μL of human Glu-plasminogen (1.46 mg/mL) and 200 μL of human t-PA (325 μg/m L) were added on top of the solid 3D fibrin clot and incubated for 2 hours at 37° C.

After 2 hours, half of the 3D fibrin clot was degraded. The supernatant could be used for subsequent analyses, such as a D-dimer ELISA, since D-dimers are an indicator for successful fibrinolysis. After an additional hour (at RT), the residual clot was also degraded.

The supernatant after degradation of an artificial human fibrin clot (cross-linked) had to be diluted at least 1:200,000 to reach the detection range of the D-dimer ELISA test (0-60 μg/mL). 300,000 to 600,000-fold dilutions yielded a mean D-dimer level of 11.5 μg/mL after treatment with a tPA-activated human Glu-plasminogen sample. So, by the treatment of the hyaline membranes in this model with Glu-plasminogen and its activator tPA, they could completely dissolved, so that the direct contact of the air gases could be restored to ensure a sufficient oxygen exchange.

lung epithelial cell line. These cells are used as a model for the last intra-alveolar cell layer, responsible for the gas exchange ($O_2$ and $CO_2$). Therefore, A549 cell cultures were set up and cellular responses to fibrin formation on their surface were observed. Fibrin formation was induced by adding fibrinogen and active thrombin to the cells in order to simulate the formation of hyaline membranes. In a second step, the lysis of a fibrin layer by means of plasminogen and further compounds was studied in a stepwise approach.

A549 cells were cultured in Dulbecco's Modified Eagle's medium supplemented with 10% fetal calf serum and antibiotics. Cells were cultured in 24-well plates and medium was changed at day three. Cells were allowed to grow until confluency at day four to start exposure experiments with fibrin layer induction followed by fibrinolytic substances one hour later. Exposure read out experiments were performed 6 (step 2) or 24 (step 1) hours later. Cellular stress will be analyzed using a validated viability assay (WST, also: WST-1 or water soluble tetrazolium) and by means of IL-8 secretion (ELISA).

Step 1: Formation of the Fibrin "Hyaline" Layer

A549 cultures were challenged by addition of fibrinogen along with thrombin (1 U/mL) to induce the formation of a fibrin layer. Fibrinogen was added at five concentrations (0.5/1/2.5/5/10 μg/mL). A treatment with thrombin and fibrinogen only served as controls. Cells grown to confluency were challenged by fibrinogen and thrombin and readout with WST-assay and IL-8 ELISA was performed 24 hours after exposure. Experiments were performed in triplicates.

WST-assay showed reduced viability (approximately 70% of unexposed control in this experiment) when cells were treated with highest fibrinogen concentration (10 μg/mL) and thrombin. Operators visually detected a gel-like layer on top of the cell culture, which represents a fibrin layer (hyaline membrane surrogate). Cells showed a decreased viability after formation of the fibrin layer.

TABLE 2

| | | Effects of thrombin and fibrinogen on cell viability (WST-assay) | | | | | |
|---|---|---|---|---|---|---|---|
| | TB | FBG 10 μg/ml | FBG 0.5 μg/ml + TB | FBG 1.0 μg/ml + TB | FBG 2.5 μg/ml + TB | FBG 5.0 μg/ml + TB | FBG 10.0 μg/ml + TB |
| Exp 1 | 70.59 | 97.08 | 81.64 | 95.02 | 71.69 | 71.83 | 67.69 |
| Exp 2 | 80.96 | 91.06 | 89.21 | 94.22 | 85.16 | 86.51 | 71.99 |
| Exp 3 | 75.26 | 94.60 | 69.64 | 79.01 | 72.79 | 72.79 | 62.82 |
| Mean | 75.61 | 94.25 | 80.16 | 89.42 | 76.55 | 77.04 | 67.50 |
| SD | 5.19 | 3.02 | 9.87 | 9.02 | 7.48 | 8.22 | 4.59 | abbreviations:
TB: thrombin,
FBG: fibrinogen,
Exp: experiment,
SD: standard deviation Example IV A549 Cell Culture Model for Hyaline Membrane Formation and Lysis A study was set up for proof-of-concept that intra-alveolar formation of fibrin containing "hyaline" membranes and their lysis can be studied in vitro by using the A549 human This outcome was confirmed by IL-8 levels, detected by a respective ELISA: IL-8 level is strongly increased for all fibrinogen and thrombin combinatorial treatments compared to fibrinogen single treatment. With the highest fibrinogen concentration (10 μg/m L) an increase of approximately 100% can be reached. This elevated stress level is due to fibrin layer formation.

TABLE 3

Effects of thrombin and fibrinogen on IL-8 levels

| | TB | FBG 10 µg/ml | FBG 0.5 µg/ml + TB | FBG 1.0 µg/ml + TB | FBG 2.5 µg/ml + TB | FBG 5.0 µg/ml + TB | FBG 10.0 µg/ml + TB |
|---|---|---|---|---|---|---|---|
| Exp 1 | 282.68 | 91.41 | 230.76 | 299.92 | 266.61 | 237.36 | 202.54 |
| Exp 2 | 225.00 | 102.46 | 212.15 | 239.66 | 248.43 | 166.30 | 179.55 |
| Exp 3 | 229.12 | 74.92 | 232.07 | 253.06 | 197.84 | 232.62 | 172.43 |
| Mean | 245.60 | 89.59 | 224.99 | 264.22 | 237.63 | 212.09 | 184.84 |
| SD | 32.18 | 13.86 | 11.14 | 31.64 | 35.64 | 39.73 | 15.73 | abbreviations:
TB: thrombin,
FBG: fibrinogen,
Exp: experiment,
SD: standard deviation Step 1 shows a successful establishment of an in vitro system to observe coagulation on A549 cells. The formation of a fibrin layer on the cells reduced their viability compared to treatment with the non-coagulated (non-crosslinked) fibrinogen only. While treatment with fibrinogen only does not stress the cells (low IL-8 levels), treatment that leads to a fibrin layer strongly increases the stress on the cells (high IL-8 levels). Both observations are a result of fibrin layer formation that reduces oxygen supply of the cells. Treatment with thrombin leads to decreased cell viability and strongly increased IL-8 levels. Thrombin-induced stress can be reduced by a combinatorial treatment with fibrinogen. Upon this dose response study, in the subsequent fibrinolysis study, the fibrin layer was performed with 10 µg/mL fibrinogen plus thrombin.

Step 2: Fibrinolysis

Fibrin layer formation was induced in A549 cell cultures according to the protocol developed in step 1. Fibrinolysis was then induced one hour after fibrin layer induction by treatment with plasminogen (40 µg/mL) with and without the addition of tissue plasminogen activator (t-PA) (3.5 µg/mL) or streptokinase (SK) (3.5 µg/mL). Cultures treated with formation of fibrin membranes alone served as coagulation control. Additional controls were treated with t-PA or SK alone.

Cell grown to confluency was challenged by coagulation substances and one hour later with fibrinolysis substances. The readout with WST-assay and IL-8 ELISA was performed 6 hours later. Experiments were performed in triplicates.

WST-assay indicates strong reduction of cell viability upon treatment with plasm in, but treatment with the precursor protein plasminogen and/or activators (SK, tPA) does not harm the cells' viability. Treatment with plasmin does not represent an in vivo situation where plasmin is not active nearby endothelial cells. In contrast, plasminogen activation at the surface of endothelial cells simulates the situation in vivo and does not show a reduction of cell viability, either in single or combinatorial treatment with activators.

TABLE 4

Effects of thrombin and fibrinogen in combination with plasmin, plasminogen, streptokinase and tPA on cell viability (WST-assay)

| | Treatment | | | | | | |
|---|---|---|---|---|---|---|---|
| | FBG 10.0 µg/ml + TB control | Plasmin | SK | tPA | PLG | PLG + SK | PLG + tPA |
| % of control | 79.23 | 31.68 | 82.23 | 70.56 | 75.63 | 78.83 | 59.17 |
| SD | 11.68 | 1.50 | 5.51 | 9.59 | 2.17 | 17.65 | 5.72 | abbreviations:
SK: streptokinase,
tPA: tissue plasminogen activator,
PLG: plasminogen,
SD: standard deviation Matching the low viability of cells treated with plasmin, IL-8 assay shows strong increase of stress level. In those cell cultures without a generation of plasmin, the stress level is low (low IL-8 levels), as fibrinolysis cannot be started: single treatment with SK, tPA and PLG.

As soon as plasmin is generated, the cells experience stress, either by treatment with plasm in or with plasminogen and activators. Starting fibrinolysis may need a certain IL-8 production as it may be necessary for the cells to reestablish their oxygen supply.

TABLE 5

Effects of thrombin and fibrinogen in combination with plasmin, plasminogen, streptokinase and tPA on IL-8 levels

| | Treatment | | | | | | |
|---|---|---|---|---|---|---|---|
| | FBG 10.0 µg/ml + TB control | Plasmin | SK | tPA | PLG | PLG + SK | PLG + tPA |
| % of control | 1501.41 | 4982.94 | 1278.69 | 1489.23 | 1312.63 | 4911.11 | 2541.75 |
| SD | 350.50 | 1274.37 | 169.54 | 62.61 | 317.73 | 806.71 | 1025.12 | abbreviations:
SK: streptokinase,
tPA: tissue plasminogen activator,
PLG: plasminogen,
SD: standard deviation Step 1 and Step 2 show the establishment of an in vitro system that enables experiments the formation of fibrin membranes and their fibrinolysis. It is shown that fibrin layer formation reduces cell viability and increases the stress level of indicators like IL-8. By adding plasminogen or plasminogen activators like SK or tPA, the cells do not experience additional stress or lose viability. By generating plasmin, the cells increase their IL-8 production to start fibrinolysis. Stress can be reduced by treating cells with the precursor protein plasminogen in combination with tPA, instead of treating cells with plasm in.

After the enzymatic removal of the fibrin layer (hyaline membrane), the ability for the gas exchange is restored. This suggests that the application/administration of Glu-plasminogen combined with its activator (tPA or SK or uPA) by inhalation can surprisingly restore the lung function even after the formation of hyaline membranes due to a severe inflammation during such as, e.g., a viral or bacterial infection.

The invention claimed is:

1. A method for treating or preventing lung dysfunction in a patient with formed hyaline membranes, wherein the patient with formed hyaline membranes is administered with sufficient amounts of Glu-plasminogen by inhalation.

2. The method of claim 1, wherein the patient is further administered with at least one plasminogen activator.

3. The method of claim 2, wherein the at least one plasminogen activator is selected from the group consisting of tissue-type plasminogen activator (tPA), urokinase-type plasminogen activator (uPA), streptokinase, and combinations of two or more thereof.

4. The method of claim 2, wherein the patient is administered with one or more doses each in the range of 0.01 to 100 mg/kg body weight of the Glu-plasminogen and one or more doses each in the range of 0.01 to 100 mg/kg body weight of the at least one plasminogen activator.

5. The method of claim 1, wherein the patient is:
(a) administered at least once with a dose of 0.01 to 100 mg/kg body weight of the Glu-plasminogen and at least once with a dose of 0.01 to 100 mg/kg body weight of the at least one plasminogen activator during a treatment period; and subsequently
(b) the level of plasminogen and the at least one plasminogen activator in the blood of the patient is determined in a step (i) and, in case the determined level of plasminogen is at least 10% (mol/mol) lower in comparison to the average level found throughout population of the same species, the patient is administered with a sufficient amount of Glu-plasminogen and optionally a sufficient amount of the at least one plasminogen activator for treating or preventing the lung dysfunction in a further step (ii); and optionally
(c) steps (i) and (ii) are conducted repeatedly as long as the level of plasminogen determined in step (i) is at least 10% (mol/mol) lower in comparison to the average level found throughout population of the same species.

6. The method of claim 2, wherein the patient is administered with both the Glu-plasminogen and the at least one plasminogen activator once per day for a time period of three or more days.

7. The method of claim 1, wherein the patient suffers from pneumonia associated with the formation of hyaline membranes.

8. The method of claim 1, wherein the lung dysfunction is associated with a viral or bacterial infection of the lung or is associated with the pathologic formation of hyaline membranes in the lung of newborns.

9. The method of claim 1, wherein the lung dysfunction is associated with a deficient lung surfactant.

10. The method of claim 1, wherein the Glu-plasminogen administered to the patient has no proteolytic activity.

11. The method of claim 1, wherein the Glu-plasminogen is administered in a combination of Glu-plasminogen and Lys-plasminogen and optionally one or more other plasminogen derivatives.

12. The method of claim 1, wherein the patient has a plasminogen deficiency.

13. The method of claim 12, wherein the plasminogen deficiency is acquired plasminogen deficiency or innate plasminogen deficiency.

14. The method of claim 12, wherein the plasminogen deficiency is acquired plasminogen deficiency caused by increased plasminogen consumption, decreased biosynthesis of plasminogen, or a combination of both.

15. The method of claim 1, wherein the patient is administered according to one of the following administration schemes:
(i) administration by inhalation with the Glu-plasminogen and administration by inhalation with at least one plasminogen activator;
(ii) administration by inhalation with the Glu-plasminogen and parenteral administration with at least one plasminogen activator; or
(iii) a sequential combination of two or more of (i) and (ii);
wherein the Glu-plasminogen and the at least one plasminogen activator are both administered to the patient within one hour.

16. The method of claim 1, wherein the patient is administered according to one of the following administration schemes:

(i) administration by inhalation of the Glu-plasminogen and administration by inhalation of at least one plasminogen activator; or
(ii) administration by inhalation of the Glu-plasminogen and intravenous administration of at least one plasminogen activator.

17. The method of claim 1, wherein the patient is administered with a Glu-plasminogen dose suitable to replace not more than 50%, of the normal plasminogen amount in the plasma compartment, wherein the normal plasminogen amount is compared to an average level found throughout a healthy population of the same species.

18. The method of claim 1, wherein the patient is further administered a pharmaceutical compound selected from the group consisting of anticoagulants, non-steroidal anti-inflammatory agents, anti-inflammatory steroidal agents, interferon beta, antiviral agents, antibiotics, chloroquine, hydroxychloroquine, nucleoside analogues, nucleotide analogues, perfluorocarbon, and a combination of two or more thereof.

19. The method of 1, wherein the lung dysfunction associated with the formation of hyaline membranes is respiratory distress syndrome (RDS) including acute respiratory distress syndrome (ARDS), infant respiratory distress syndrome (IRDS), surfactant deficiency disorder (SDD), or hyaline membrane disease (HMD).

20. The method of claim 1, wherein the lung dysfunction associated with the formation of hyaline membranes is associated with a viral or bacterial infection of the lung.

21. The method of claim 20, wherein the viral infection is selected from the group consisting of infections with influenza viridae, adenovirus, or cytomegalic virus, respiratory syncytial virus (RSV), human parainfluenza virus, metapneumovirus, severe acute respiratory syndrome coronavirus (SARS-CoV, SARS-CoV-1), severe acute respiratory syndrome coronavirus 2 (SARS-CoV-2), middle East respiratory syndrome virus (MERS-CoV), hantaviruses, herpes simplex virus (HSV), varicella-zoster virus (VZV), measles virus, rubella virus, cytomegalovirus (CMV), smallpox virus, dengue virus, and a combination of two or more thereof.

22. The method of claim 1, wherein the lung dysfunction is a deficiency of lung surfactant in a preterm newborn or in a patient suffering from a chronic inflammatory lung disease.

23. The method of claim 1, wherein the patient bears a Glu-plasminogen deficiency.

24. The method of claim 1, wherein the patient has a lower blood level of plasminogen than the average blood level of plasminogen found throughout a population of the same species.

* * * * *